Dec. 31, 1929.                W. K. HOWE                1,742,076
                              TRAIN CONTROL
                           Filed Oct. 9, 1922           2 Sheets-Sheet 1
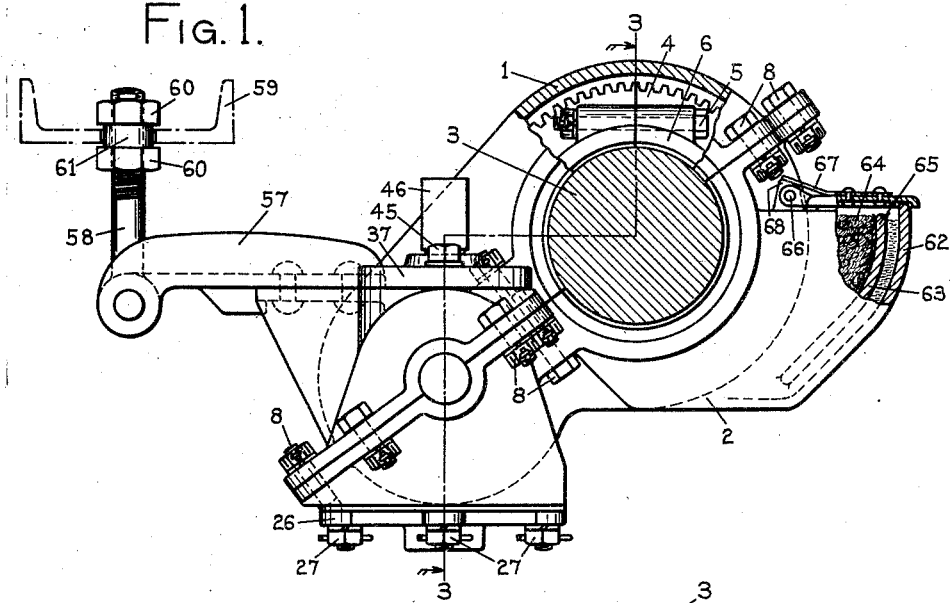
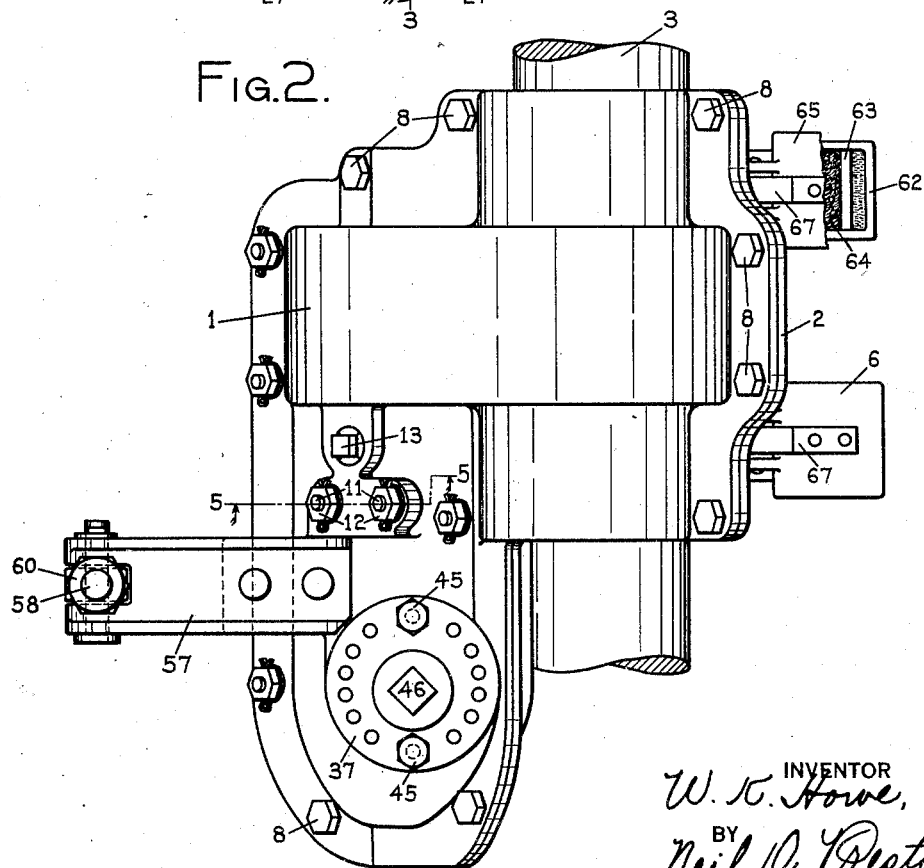
INVENTOR
W. K. Howe,
BY
Neil D. Preston
his ATTORNEY Dec. 31, 1929.                    W. K. HOWE                   1,742,076
                                 TRAIN CONTROL
                            Filed Oct. 9, 1922              2 Sheets-Sheet 2
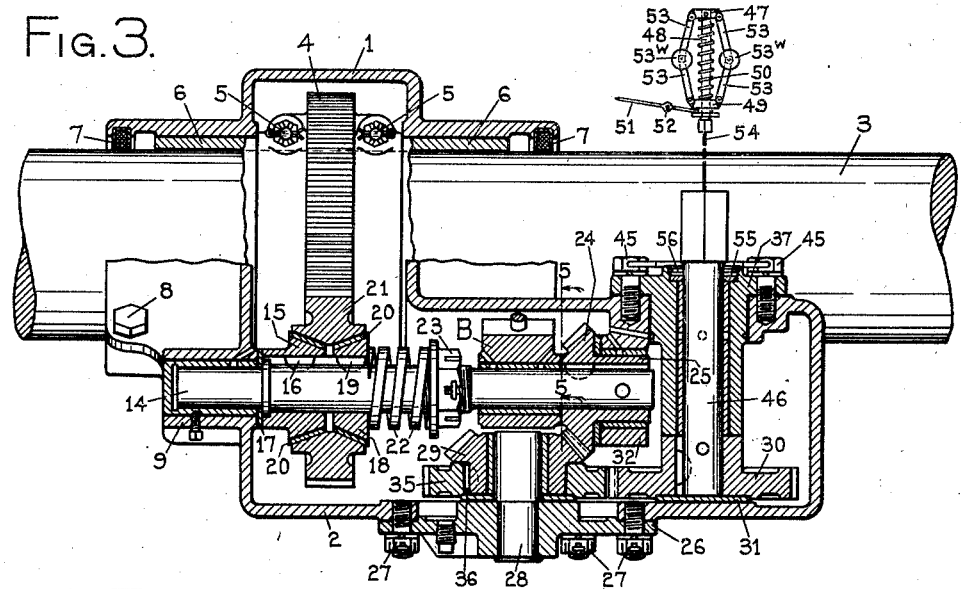
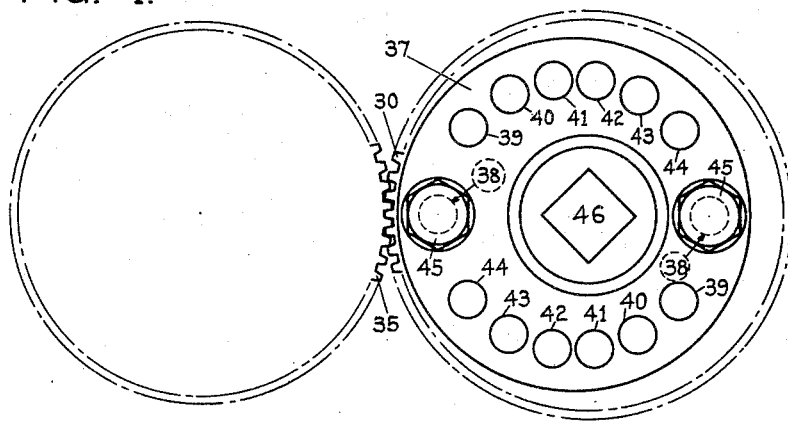
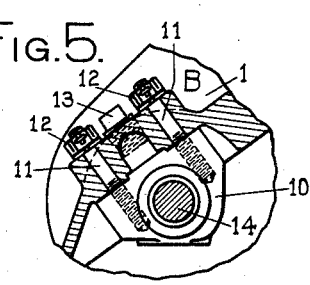
INVENTOR
W. K. Howe,
BY
Neil D. Preston,
his ATTORNEY Patented Dec. 31, 1929

1,742,076

UNITED STATES PATENT OFFICE

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK

TRAIN CONTROL

Application filed October 9, 1922. Serial No. 593,357.

This invention relates to speed responsive devices driven from the axles of railway vehicles, and more particularly to the driving connection between such devices and the axles of such vehicles.

It has been found desirable to employ a speed responsive device which continually indicates, and which is continually responsive to the speed at which railway vehicles travel in conjunction with suitable cooperating train control apparatus. The usual and most universal construction of railway vehicles consists of axles having a wheel firmly shrunk or keyed near each of its opposite ends, bearings being provided adjacent these wheels either between or on the outside thereof, for supporting the car truck or car structure. It is, therefore, apparent that these wheels must make the same number of revolutions, regardless of the difference in distance of track traveled over by these two wheels. For instance, when such a vehicle passes around a curve one of the wheels prefers to run faster than the other, and does run faster by adhering to the rails until the torsion in the shaft has become so great that one or the other of the wheels slip, at which time there will be a sudden jerk in certain parts of said axle depending on which of the two wheels has slipped.

When speed responsive devices are driven from the wheels and axles of the railway vehicle they will not indicate accurately the speed at which the vehicle is actually traveling as the diameter of the car wheels changes, either due to actual wear of these wheels, or to the turning or grinding down of the wheels to remove flat spots.

The principal objects and purposes of the present invention consist in the provision of a driving connection for operating speed responsive devices from the axles of railway vehicles, which will remedy certain of the difficulties above specifically pointed out, and will facilitate the correction of others. More specifically, these objects and purposes consist in the provision of a driving connection which is adapted to transmit only a limited torque, so that when the axle suddenly accelerates or decelerates, due to slippage of one or the other of the car wheels, this sudden change of speed will not be transmitted to the speed responsive device, and in the provision of a very simple, inexpensive, and easily changed system of gears for obtaining any desired gear ratio within reasonable limits between the unit comprising the usual wheels and car axle and the shaft of the speed responsive device.

Other objects, advantages and characteristic features of the invention will in part be pointed out and in part become obvious as the description of the invention progresses.

In describing the invention in detail, reference will be made to the accompanying drawings, in which:—

Figure 1 is a side elevation of one embodiment of the invention, portions being broken away, and the axle of a railway vehicle being shown in cross section;

Fig. 2 is a plan view of the device shown in Fig. 1;

Fig. 3 is a sectional view of the invention taken on the line 3—3, Fig. 1, as viewed in the direction of the arrows;

Fig. 4 is a diagrammatic illustration of how a shaft may be conveniently supported to facilitate adjustment of its axis to and from the axis of another shaft, parts of the device being shown in detail; and Fig. 5 is a cross section of a bearing support taken on the line 5—5, Fig. 3.

Referring to the accompanying drawings, 1 and 2 represent the top and bottom respectively of a sectional casing or housing adapted to be assembled on to a car axle to house and support suitable devices to be more clearly described. In practice, this top portion 1 and bottom portion 2 are bolted around a railway car axle by bolts 8. On the axle 3 of a railway vehicle is clamped a split or sectional gear 4 held together and maintained in operative relation with the axle by bolts 5. This sectional gear is provided with flanged extensions 6, which serve as the journal upon which the housing 1—2 is adapted to ride. In order to prevent dirt and the like from entering between the flanges 6 and the housing 1—2, this housing is provided with a groove extending around the axle opening thereof containing felt retaining rings 7.

In the lower part of the split housing are provided bearings 9 and B. The bearing B has been more clearly illustrated in Fig. 5, and comprises a bearing block 10 bolted within and under the top of the top housing section 1 by bolts 11 and nuts 12. An oil plug 13 is provided to facilitate proper lubrication of this bearing B. In the bearings 9 and B is supported a shaft 14 on which is fixedly fastened a tapered clutch member 15 by the key 16, which is adapted to bear against the bearing plate 17. Slidably and non-rotatably mounted upon the shaft 14 adjacent the clutch member 15 is another similar clutch member 18 provided with a key 19. Each of these tapered clutch members is provided with a clutch lining 20 on which is adapted to ride the pinion 21, having an opening extending therethrough which is tapered to correspond to the tapered linings 20. The clutch member 18 is urged toward the clutch member 15 by a spring 22 extending between the clutch member 18 and the nut 23, whereby a frictional driving connection between the shaft 14 and the pinion 21 is provided. The tension of the spring 22 may be adjusted by varying the position of this nut 23 on the shaft 14. To the other end of the shaft 14 is keyed a bevel-pinion 24, having a flanged extension 25 pivotally supported in the bearing 32.

The bottom wall of the casing 1—2 is provided with a large circular opening against which is bolted a plate 26 by bolts 27. Into this plate 26 is riveted a stud 28 serving as a journal for the flanged bevel-gear 29, which is in mesh with the bevel-pinion 24. Upon the flanged extension of the bevel-gear 29 is keyed a spur-gear 35 by an arcuate key 36. In practice, this spur-gear 35 may be readily interchanged with another spur-gear of a slightly different diameter and having a different number of teeth. This may be accomplished by removing the plate 26, after which the bevel-gear 29 and spur-gear 35 may be lifted out and another spur-gear substituted for the spur-gear 35 on the bevel-gear 29, after which these devices may then again be assembled.

The top wall of the housing 1—2 provided with a similar but smaller opening, in which is supported a flanged-collar 37. The flange of this collar is provided with holes 38, 39, 40, 41, 42, 43 and 44, so that this collar may be turned so that any one of the pairs of holes will align with the cap screws 45 threaded into the top wall 1 of the casing. This flanged-collar 37 is unsymmetrically constructed, in that, the hole extending therethrough is disposed eccentrically with respect to the outside wall of the collar and the holes 38 to 44 respectively arranged on the flange thereof. It is thus seen that when the cap screws 45 are removed and the flanged collar 37 is turned from one position to another that the shaft 46 journaled in this flanged collar will have its axis changed with respect to the stud 28, thereby facilitating adjustment of the distance between this shaft 46 and stud 28.

To the lower end of this shaft 46 is keyed a spur-gear 30, which is in mesh with the spur-gear 35, the side of this spur-gear 30 being counterbored and provided with a bearing plate 31 bearing against the side wall of the casing, thereby forming a thrust bearing. The top end of the shaft 46 extends through the felt retaining gasket 55 and retainer 56 beyond the outside of the casing, and is squared to facilitate the connection of a shaft having universal couplings, or a flexible shaft, conventionally shown by the line 54, having its opposite end connected to a speed responsive device. This speed responsive device may take any one of various forms and has merely been illustrated in a conventional manner. As illustrated, this speed responsive device comprises a collar 47 rigidly fastened to the driving shaft 48, having a collar 49 slidably mounted on this shaft and biased from the collar 47 by a spring 50. The collar 47 and collar 49 are connected together by a link construction, comprising links 53 pivotally connected to weights $53^w$, whereby rotation of the shaft 48 causes the weights $53^w$ to separate, thereby moving the collar 49 up against the tension of the spring 50 to cause slidable movement of the collar 49 on the shaft 48 in response to the speed of rotation of the shaft 48. The collar 49 is provided with an external groove into which extends one end of a lever arm 51 pivoted by the pin 52, the movement of the opposite end of this lever arm being responsive to the speed of the shaft 48 is suitable to indicate the speed at which the vehicle is traveling and to operate suitable train control apparatus and the like, if desired.

In order to support the gear casing 1—2 in a predetermined relation to the vehicle, for instance, so that the shaft 46 is disposed substantially vertically, the top portion 1 of the casing has riveted thereto an arm 57 to which is pivotally fastened an eyebolt 58, this eyebolt 58 being anchored in a channel beam 59 suitably fastened to the vehicle truck frame. This eyebolt 58 is somewhat loosely fastened in the channel beam 59 by nuts 60 and spacing sleeve 61 to form a pivotal connection. This construction removes stresses and strain from the transmitting connection leading to the speed responsive device in a construction where a shaft having universal joints is used, and further transmits the speed more accurately in a system where a flexible shaft is used for this purpose.

The bottom portion 2 of the casing is provided with a pocket 62 on each side of the gear 4, having a shield 63 between which and the journals 6 is provided waste or other suitable absorbent material 64. This absorbent material 64 is saturated with oil, and since it extends below the level of the oil in the casing, which may be as high as the bottom of the railway axle 3, this absorbent material is maintained saturated by absorption. In order to keep dirt and cinders out of these pockets 62, they have been provided with a cover 65 pivoted on the pin 66 and adapted to be urged to an open or closed position by a spring 67 engaging the cam portion 68.

If now a railway vehicle is passing around a curve along a track, the wheels on the opposite ends of the axle 3 will adhere to the rails until a certain amount of torsion is set up in the axle 3, after which the friction between the wheels and the track will be insufficient to further increase the torque in the shaft caused by this torsion, thus causing one or the other of the wheels to slip, thereby producing a jerk and relieving the shaft of the stress due to such relative displacement between its ends. If the split gear 4 is located somewhere near the middle of the shaft, this jerk will tend to jar the speed responsive device each time either one or the other of the wheels slip, and will cause very severe stresses in the transmitting connection between the car axle and this device. Such jars and jerks also accelerate or decelerate the governor, thereby causing inaccurate indication of the actual speed of the vehicle. Similarly sudden acceleration or deceleration of the train itself, especially when starting, or when the train is suddenly brought to a stop by the application of the brakes, causes such undesirable inaccuracies and severe stresses and strains. In the driving connection embodying the present invention, such strains will not be transmitted because the clutch members 15, 18 and 21 will slip when a sudden heavy torque is attempted to be transmitted as in this case.

If now it is desired to change the gear ratio between the car axle 3 and the speed responsive device, it is merely necessary to remove the plate 26 after which the bevel-gear 29 and spur-gear 35 may be lifted out. The spur-gear may then be lifted off of the bevel-gear 29 and another spur-gear of a slightly different diameter, and possibly having one tooth more than the one just removed may be put in its place. These gears may then be slipped on to the stud 28, and the plate 26 again replaced to its original position. In order to allow such replacement of the plate 26, it will first be necessary to remove the cap screws 45 turning the flanged collar 37 to the proper angular relation, after which the cap screws 45 may be replaced. This adjustment of the flanged collar 37 will give the proper and desired engagement between the newly substituted gear 35 and the gear 30 on the shaft 46. It is thus seen that the gear ratio between the car axle 3 and the speed responsive device may be very readily changed by merely substituting one gear for another.

Having thus shown one specific embodiment of my invention, I desire to have it understood that this does not exhaust all possible modifications and adaptations of the invention, and that various changes and additions may be made without departing from the scope thereof.

What I claim and desire to secure by Letters Patent of the United States, is:—

1. In a speed indicating device, the combination of a unit comprising a pair of wheels and an axle fixedly connected together, a centrifugal speed responsive device, and means for driving said centrifugal speed responsive device by said unit including means for transmitting only a given degree of acceleration.

2. In a speed indicating device, the combination of a unit comprising a pair of wheels and an axle fixedly connected together, a centrifugal speed responsive device, and means for driving said centrifugal speed responsive device by said unit including means maintaining a driving connection under ordinary degrees of acceleration, but breaking said driving connection at a predetermined degree of acceleration.

3. A speed indicating device for railway vehicles comprising, a unit consisting of the usual wheels and axle of a railway vehicle, a centrifugal speed responsive device, means for driving said centrifugal speed responsive device by said unit including a friction clutch, and means for varying the transmitting capacity of said clutch.

4. A speed indicating device for railway trains comprising, a centrifugal speed responsive device, a unit consisting of the usual wheels and axle of a railway vehicle, and means for driving said centrifugal speed responsive device by said unit in a manner to produce a definite ratio between the speed of said two devices, said means including an adjustable friction clutch and means for altering said ratio.

5. A speed indicating device for railway trains comprising, a unit consisting of a pair of wheels and an axle of a railway vehicle, a speed responsive device, means for driving said speed responsive device by said unit including a casing having a pair of gears therein, means permitting ready substitution of a gear of different diameter for one of said gears including a plate having a bearing stud for rotatably supporting one of said gears bolted over a large opening in said casing through which said gear may be inserted and removed, and means for adjusting the operative relation between said gears.

6. A speed indicating device for railway vehicles driven from the axle thereof comprising, a gear connected for rotation with the car axle, a housing for said gear, a readily removable gear in said casing driven by said first mentioned gear, a speed shaft projecting from said casing having a gear thereon meshing with said readily removable gear, and means for rotatably mounting said speed shaft different distances from said removable gear, whereby when a gear of slightly different diameter is substituted for said readily removable gear the gear on the speed shaft may be brought into proper meshed relation with said removable gear.

7. A speed indicating device for railway vehicles comprising, a casing mounted adjacent the car axles of said vehicle, a speed shaft projecting from said casing adapted to be driven by said axles, a flanged journal having its flange eccentric with respect to the journal for rotatably supporting said speed shaft, the flange of said journal being adapted to be mounted over an opening in said casing in various angular positions, whereby the axis of the speed shaft assumes a different position for each adjustment of said flange.

8. Mechanism for driving a speed responsive device for railway vehicles comprising, gear portions adapted to be clamped on the axle of a railway vehicle to form a complete gear having extensions forming journals, a casing pivotally supported on said journals, a shaft in said casing having clutch members urged toward each other, a pinion on said shaft between said clutch members and in operative engagement with said gear, and means extending from said casing for driving said speed responsive device.

9. Mechanism for driving a centrifugal speed responsive device for railway vehicles comprising, a casing mounted adjacent a car axle of said vehicle, a shaft in said casing, oppositely disposed cone members splined to said shaft, a pinion driven by said car axle disposed between said cone members and having clutch surfaces engaging said members, spring means for forcing said cone members together, and a shaft driven by said cone members and adapted to be connected to a centrifugal speed responsive device.

10. Mechanism for driving a centrifugal speed responsive device for railway vehicles comprising a gear having extending flanges on opposite sides thereof, a casing mounted for rotation on said flanges, a speed shaft adapted to be connected to a centrifugal speed responsive device extending from said casing, and means for driving said speed shaft by said gear including a spring pressed adjustable friction slip clutch, whereby a driving connection is maintained under ordinary conditions of acceleration, and said driving connection is broken when a given degree of acceleration is exceeded.

11. A speed indicating device for railway vehicles comprising, an axle, a centrifugal speed responsive device, and mechanism for driving said centrifugal speed responsive device by said axle including means for maintaining a driving connection between said centrifugal speed responsive device and said axle until a predetermined degree of acceleration is exceeded.

In testimony whereof I hereto affix my signature.

WINTHROP K. HOWE.